Patented Mar. 17, 1953

2,631,942

UNITED STATES PATENT OFFICE 2,631,942

METHODS OF FORMING FIBERS FROM COLLAGEN

John H. Highberger, Marblehead, Mass., assignor to United Shoe Machinery Corporation, Flemington, N. J., a corporation of New Jersey No Drawing. Application May 1, 1951, Serial No. 224,050

5 Claims. (Cl. 106—124)

This invention relates to a process for forming fibers from collagenous extracts.

Naturally occurring fibrous proteins, in general, possess certain fine structural features peculiar to the particular classes of fibers. These structural features usually result in the presence of axial periodicities, or regular variations in electron density in a direction parallel to the long axis of the fiber. Such axial periodicities may in favorable cases be directly observed in the electron microscope, or they may, in other cases, be deduced from X-ray diffraction patterns produced at high or at low angles from gross specimens of the fibers.

As examples of fine structure characteristics of certain naturally occurring fibrous proteins, observable in the electron microscope, the following may be cited from the literature:

(a) Fibrin, the fibrous protein found in blood clots, forms in such clots fibers in which an axial periodicity of approximately 250 Å. (Å.=1 Angstrom unit=1×10⁻⁸ cm.) may be observed in the electron microscope.

(b) Myosin, the fibrous protein which comprises the contractile component of muscle, exhibits in the electron micropscope an axial periodicity varying between 250 Å. and 450 Å., depending upon the state of contraction.

(c) Collagen, one of the most important structural proteins of the animal body, which is widely distributed in most tissues but which occurs to the largest extent in skin and other forms of connective tissue, shows in the electron microscope an axial periodicity of 640 Å.

Of all the fibrous proteins thus far studied in the electron microscope, collagen presents perhaps the most easily reproducible and characteristic set of features. The banded or striated structure which constitutes the 640 Å. period is observable in preparations made by ordinary techniques, and this permits the ready identification of collagen fibers even when they constitute only a minor fraction of the material present. By the use of special techniques a much more detailed fine structure may be demonstrated, and by such means as many as seven intraperiod bands have been observed in the fundamental 640 Å. period.

It has recently been found that extracts of certain types of connective tissue, such as calf skin, steer hide, rat skin, and rat tail tendon, are capable of forming under certain conditions fibrous forms of a new type. (Highberger, Gross and Schmitt, J. Am. Chem. Soc., 72, 3321 (1950).)

The extracts in question are produced by soaking the macerated tissue in 4 to 5 volumes of acid buffer solution of pH 3.0–4.0 and ionic strength 0.1–0.2. Citrate buffers are usually used, but the same results may be produced by other buffers of the given pH and ionic strength. The extraction is usually carried out in the cold, at a temperature of 0–5° C. At the end of the extraction period, usually 15–48 hours, the liquid is separated from the undissolved tissue, and filtered through a fine filter paper or through a sintered glass filter of medium or fine porosity. Examination of this filtrate in the electron microscope reveals only unstructured and poorly defined material consisting of extremely fine filaments. On dialysis of the filtrate against water, however, a precipitate is formed, the composition of which, as shown by the electron microscope, may vary depending upon the conditions of dialysis or the particular point during the dialysis at which it is examined. It may under some conditions consist entirely of well formed normal collagen fibers, displaying the characteristic 640 Å. period, with all of the fine structure found in other collagenous preparations. Under other conditions it may consist entirely of the new fibrous form. This may exist in several modifications, varying from broad, flat segments to long fibers. All are characterized, however, by the possession of an axial period several times that of normal collagen. The actual value of the period varies from about 2000 Å. in some preparations to about 2600 Å. in others. In all cases, however, the bands marking the periods stand out in marked contrast to the remaining portions of the fiber, and in shadowed preparations they are revealed as ridges of pronouncedly greater thickness. Under still other conditions of dialysis both these new forms and the normal collagen form occur together.

Whether these new forms are in fact a new form of collagen is not yet clearly established. They do, however, represent a fibrous structure entirely different from any previously observed, and that their connection with collagen is a close one may be inferred from the source and manner of their production.

As described above, the new fibrous forms, which may be termed long-spacing forms, are obtained from many connective tissues by extracting the tissue with an acid buffer of ionic strength 0.1–0.2, and dialyzing the resulting solution. If, however, the ionic strength of the acid buffer is below the range stated, or if the tissue has previously been several times extracted with a mildly alkaline buffer (as, for example, a 0.65 M solution of disodium phosphate), the long-spacing forms cannot be obtained from the resulting solutions. Dialysis of such solutions yields only normal collagen fibers, or, in some cases, unstructured filaments.

I have found that mucoproteins will combine with the acid-soluble collagen in such solutions and that fibers precipitated, as by dialysis from solutions to which sufficient mucoprotein has been added, may consist entirely of the long-spacing fibers. I have also found that, with smaller additions of mucoprotein, the amount of long-spacing fibers is smaller and normal collagen fibers will also be precipitated with a corresponding reduction in the amount of long-spacing fibers.

It is a feature of the present invention to provide a new process for the formation of fibers from solutions of acid-soluble collagen.

It is a further feature of the present invention to provide a new process for the formation of a new type of fiber from solutions of acid-soluble collagen.

In the process of the present invention fibers are formed by precipitation of the product of adding a mucoprotein to a solution of acid-soluble collagen.

The collagen solution may be prepared by known procedures which involve in general the extraction of animal connective tissue with an acidic aqueous medium. Calf skin, steer hide, rat skin, rat tail tendon and similar connective tissues have been found suitable source materials for preparing soluble collagen.

The tissue material may be extracted first with a mildly alkaline buffer as for example a 0.05 M solution of disodium phosphate followed by extraction with an acid buffer having a pH of 3.0 to 4.0 and an ionic strength of 0.1 to 0.2 for example a citrate buffer solution. Alternatively the tissue may be extracted directly with an acid buffer. The solutions obtained by these alternative procedures are somewhat different in character, but both solutions may be used in the formation of fibers.

The mucoprotein component employed may be a highly purified material such as that isolated from blood by a method such as that disclosed by Weimer, Mehl and Winzler, J. Biol. Chem. 185, 561 (1950). However, much cruder mucoprotein material may be used. For example excellent results have been obtained with partially deproteinized blood serum and partially deproteinized blood plasma.

When mucoprotein is added to collagen solutions containing dissolved collagen in the order of 0.1% by weight in amount sufficient to give a final concentration of mucoprotein upwards of 0.001%, there is obtained a product which forms long-spacing fibers on precipitation by dialysis or other means.

The following examples of processes according to my invention are given to aid in understanding the invention and it is to be understood that the invention is not restricted to the use of the particular materials or procedural details given in the examples.

*Example 1*

A portion of an eight month old embryonic calf skin was macerated and extracted at 0° C. for 48 hours in 10 volumes of 0.1 M disodium phosphate solution. The resulting solution was then poured off and the extraction repeated twice with fresh phosphate solution. The extracted skin was then washed thoroughly in water. It was then washed twice for ten minute periods in 0.05 M citrate buffer of pH 4.0. Following this the skin was soaked at 0–5° C. for 15 to 48 hours in fresh 0.05 M citrate buffer of pH 4.0, 5 to 10 volumes of buffer being used per unit weight of original skin. At the end of the extraction period, the supernatant solution was separated from the undissolved skin by any convenient process, and filtered through a fine filter paper such as Schleicher and Schull No. 576. In the meantime, beef cattle blood was obtained from an abattoir and allowed to coagulate. The serum was removed from the clot, and an equal volume of one-half saturated ammonium sulfate solution was added to the collected serum. After standing in the cold for one to two hours, the precipitate was filtered off and the filtrate was dialyzed against water until it was sulfate free. It was then adjusted to pH 4.0 with acetic acid. Five parts by volume of this solution was added to 50 parts by volume of the skin extract filtrate, the preparation of which is described above. On dialysis of the mixture, a copious precipitate was formed, which on examination in the electron microscope was found to consist largely of well-formed long-spacing fibers.

A similar portion of skin extract filtrate dialyzed at the same time without the addition of serum was found to contain no long-spacing fibers at all, but only normal collagen or unstructured filaments.

*Example 2*

Fresh beef cattle blood was collected at an abattoir, with the addition of sodium citrate or sodium oxalate in the usual amounts to prevent coagulation. The blood was centrifuged to remove the red corpuscles, and to the straw colored plasma 0.1 volume of M sodium acetate solution and 0.9 volume of distilled water were added. Ammonium sulfate was then added to a final concentration of 2.73 M. After standing for at least 16 hours at 0–4° C. the solution was filtered and 1N hydrochloric acid was added to the filtrate until the pH was 4.9. After standing for 16 hours at 0–4° C. the solution was again filtered, and the pH of the filtrate further reduced to 3.7 with 1N hydrochloric acid. This solution was again allowed to stand at 0–4° C. for at least 16 hours, filtered, and the filtrate saturated with ammonium sulfate. The saturated solution was allowed to stand at 0–4° C. for at least 72 hours. The resulting precipitate was filtered off, dissolved in a small volume of water, dialyzed until free of sulfate, and dried by lyophilization. The dry material thus obtained was impure mucoprotein. A portion of the dry material was partially purified by redissolving in water to a concentration of 2 percent, adjusting the solution to pH 3.7, and reprecipitating by saturating with ammonium sulfate. The resulting precipitate was redissolved in water, dialyzed until free of sulfate, and dried by lyophilization.

Portions of the impure mucoprotein and of the partially purified mucoprotein thus prepared, were added to portions of a skin extract filtrate similar to that described in Example 1, in amounts to make final concentrations of mucoprotein in the range 0.001–0.1%. In each case long-spacing fibers were formed on dialysis.

Having thus described my invention, what I claim as new and desire to secure by Letters Patent of the United States is:

1. The process of producing fibers comprising addition of mucoprotein from blood to an aqueous solution of acid-soluble collagen and precipitation of the product by dialysis against water.

2. The process of producing fibers comprising the addition of mucoprotein from blood to an aqueous solution of acid-soluble collagen extracted from animal connective tissue and precipitation of the product by dialysis against water.

3. The process of producing fibers having axial periodicity in the range of 2000 to 2600 Å., said process comprising the addition of at least one part of mucoprotein from blood to an aqueous solution comprising 100 parts of acid-soluble collagen extracted from animal connective tissue and precipitation of the addition product by dialysis against water.

4. The process of producing fibers having an axial periodicity in the range of 2000 to 2600 Å., said process comprising the addition of partially deproteinized blood serum in amount sufficient to provide at least one part of mucoprotein to an aqueous solution comprising 100 parts of acid-soluble collagen extracted from animal connective tissue by means of an acidic aqueous medium, and precipitation of the addition product by dialysis against water.

5. The process of producing fibers having an axial periodicity in the range of 2000 to 2600 Å., said process comprising the addition of partially deproteinized blood plasma in amount sufficient to provide at least one part of mucoprotein to an aqueous solution comprising 100 parts of acid-soluble collagen extracted from animal connective tissue by means of an acidic aqueous medium, and precipitation of the addition product by dialysis against water.

JOHN H. HIGHBERGER.

REFERENCES CITED

The following references are of record in the file of this patent:

Roche: Chem. Absts., page 3447, vol. 30 (1936).
Roche: Chem. Absts., page 2211, vol. 30 (1936).
Weimer et al.: Chem. Absts., page 10783, vol. 44 (1950).